(12) United States Patent
Ford et al.

(10) Patent No.: US 7,647,480 B2
(45) Date of Patent: Jan. 12, 2010

(54) HANDLING OF CONDITIONAL INSTRUCTIONS IN A DATA PROCESSING APPARATUS

(75) Inventors: Simon Andrew Ford, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 204 days.

(21) Appl. No.: 11/632,698

(22) PCT Filed: Jul. 27, 2004

(86) PCT No.: PCT/GB2004/003258
§ 371 (c)(1), (2), (4) Date: Jan. 18, 2007

(87) PCT Pub. No.: WO2006/010872
PCT Pub. Date: Feb. 2, 2006

(65) Prior Publication Data
US 2007/0208924 A1    Sep. 6, 2007

(51) Int. Cl.
*G06F 9/38*    (2006.01)
(52) U.S. Cl. ..................... 712/216; 712/218
(58) Field of Classification Search ............... 712/216, 712/218
See application file for complete search history.

(56) References Cited

U.S. PATENT DOCUMENTS

| | | | |
|---|---|---|---|
| 4,532,587 A * | 7/1985 | Roskell et al. .............. 712/38 |
| 5,524,255 A * | 6/1996 | Beard et al. ................ 712/203 |
| 5,889,983 A | 3/1999 | Mittal et al. |
| 7,346,760 B2 * | 3/2008 | Yoshida et al. ............. 712/213 |
| 2002/0002666 A1 | 1/2002 | Dulong et al. |
| 2003/0221090 A1 | 11/2003 | Wilson |

OTHER PUBLICATIONS

International Search Report of PCT/GB2004/003258, mailed May 30, 2005.

* cited by examiner

Primary Examiner—William M Treat
(74) Attorney, Agent, or Firm—Nixon & Vanderhye P.C.

(57) ABSTRACT

A data processing apparatus and method of handling conditional instructions in such a data processing apparatus are provided. The data processing apparatus has a pipelined processing unit for executing instructions including at least one conditional instruction from a set of conditional instructions, and a register file having a plurality of registers operable to store data values for access by the pipelined processing unit when executing the instructions. A register specified by an instruction may be either a source register holding a source data value for that instruction or a destination register into which is stored a result data value generated by execution of that instruction. The register file has a predetermined number of read ports via which data values can be read from registers of the register file. The pipelined processing unit is operable when executing the at least one conditional instruction to produce a result data value which, dependent on the existence of the condition specified by that conditional instruction, represents either the result of the computation specified by that conditional instruction or a current data value stored in the destination register for that conditional instruction. Further, each conditional instruction in the set is constrained to specify a register that is both a source register and a destination register for that conditional instruction, thereby reducing the minimum number of read ports required to support execution of that conditional instruction by the pipelined processing unit.

15 Claims, 4 Drawing Sheets

```
Instruction Sequence
        MOV     R1 ,  R6
        CMP     R7 ,  R8
        ADDEQ   R1 ,  R3
        SUB     R1 ,  R1 ,  R5

ADDEQ  R1, R3
       If CondPassed ( )
              R1 : =  R1 +  R3
       else
              R1 : =  R1
```

Instruction Sequence
    MOV      R1 , R6
    CMP      R7 , R8
    ADDEQ  R1 , R3
    SUB      R1 , R1, R5

ADDEQ R1, R3
    If CondPassed ( )
        R1 := R1 + R3
    else
        R1 := R1

HANDLING OF CONDITIONAL INSTRUCTIONS IN A DATA PROCESSING APPARATUS

This application is the US national phase of international application PCT/GB2004/003258, filed 27 Jul. 2004, which designated the U.S., the entire content of which is hereby incorporated by reference.

TECHNICAL FIELD OF THE WXENTION

The present invention relates to a data processing apparatus and method for executing instructions including one or more conditional instructions, and in particular to techniques for handling such conditional instructions within the data processing apparatus.

BACKGROUND

Traditionally, the instructions provided within an instruction set were non-conditional, and hence if issued to an execution unit of a data processing apparatus those instructions would be executed. To provide for different flows of execution of instructions, branch instructions were provided which were conditional, such that the execution flow could hence branch to some predetermined point if the condition specified in association with that branch instruction was met.

One known type of data processing apparatus includes a pipelined processor incorporating a plurality of pipeline stages. A prefetch unit is typically provided in such a data processing apparatus to prefetch instructions for execution by the pipelined processor, in order to provide the pipelined processor with a steady stream of instructions to execute. Such prefetch units often include branch prediction logic to predict for conditional branch instructions whether the branch will be taken or not, and to prefetch instructions accordingly. However, in the event that the branch prediction proves wrong, this often requires a significant number of instructions to be flushed from the pipeline, and for new instructions to then be refetched and executed by the pipelined processor, which can have a significantly adverse effect on performance.

Another type of instruction set which has been developed is the predicated instruction set, where typically a majority of the instructions in the instruction set are conditional instructions. This enables a significant reduction in the number of branch instructions used and accordingly reduces the chance that an incorrect sequence of instructions is prefetched into the pipelined processor. For example, if a sequence of operations is considered where a comparison takes place, and then an add operation is performed if the values compared are equal, then with an instruction set that only supported conditional branch instructions, this functionality would need to be implemented by a compare instruction, followed by a branch instruction to cause a branch to another portion of the code to take place if the values compared were not equal, followed by an add instruction. However, with a predicated instruction set, the same functionality could be achieved through the use of a compare instruction followed by an add instruction which is specified as being conditional on the result of the comparison instruction indicating equality. In such an example, it can be seen that the use of a predicated instruction set improves code density, and also avoids the possibility that an incorrect sequence of instructions is issued to the execution pipeline based on an incorrect prediction of the outcome of a branch instruction.

Whilst the use of such predicated instruction sets can be beneficial, particularly in highly pipelined implementations, it can result in an increase in complexity of the design of the pipelined processing unit in order to allow correct execution of an instruction which has already been issued to the execution pipeline, and which specifies as one of its source registers a destination register of such a predicated instruction. Such an instruction will be referred to herein as a dependent instruction. By way of example, consider the following sequence of two instructions:

ADDEQ R2, R1, R3

SUB R3, R2, R4.

The ADDEQ instruction is a predicated instruction which, assuming the result of some previous comparison was equality, will execute in order to store in register R2 the sum produced by adding the contents of registers R1 and R3. The following SUB instruction is non-conditional, and is arranged to subtract the contents of register R4 from the contents of register R2, and to place the result in register R3. Since the SUB instruction requires the contents of register R2 as one of its operands, it is clearly dependent on the ADDEQ instructions that precedes it. If the ADDEQ instruction executes, then the value of R2 is given by the sum produced by the execution of the add instruction, whereas if the ADDEQ instruction does not execute (because the result of the earlier comparison was not equality), then the value of R2 required by the SUB instruction is not produced by the preceding ADDEQ instruction, but is instead the value already stored within register R2.

In order to support execution of such dependent instructions within the pipelined processing unit, it is typically necessary to provide complex forwarding paths with multiplexing logic therein that can select different source operands for the dependent instruction depending upon whether the preceding predicated instruction was executed or not. This can clearly adversely impact the potential benefits to be realised from using a predicated instruction set.

One possible way of alleviating the above problem would be to arrange the operations performed within the pipelined processing unit in order to execute the predicated instruction such that a result is always output. Hence, considering the earlier ADDEQ example, then if the earlier compare operation produced equality, the add instruction would be executed to generate as the value for register R2 the sum of the data values in registers R1 and R3, whereas if the earlier compare operation produced a result other than equality, the execution of the add instruction would merely output the existing value of R2 as the result.

However, in order to support such functionality, not only do the source registers of the predicated instruction need to be read, but also the destination register needs to be read, into the pipelined processing unit, so that the pipelined processing unit is able to produce either result as required.

The registers specified by instructions executed within the pipelined processing unit will normally reside within a register file that has a predetermined number of read ports. The provision of each read port increases the size of the data processing apparatus, and accordingly increases the cost of producing that data processing apparatus. Further, the more read ports supported, the more complex the design of the pipelined processing unit, which also increases cost. Accordingly, it is desirable to keep the number of read ports to a minimum, and hence the potential approach of also reading the destination register in addition to the source registers is likely to be considered impractical in some implementations.

Accordingly, it would be desirable to provide an improved technique for handling conditional instructions within the pipelined processing unit of a data processing apparatus.

SUMMARY

Viewed from a first aspect, the technology provides a data processing apparatus, comprising: a pipelined processing unit operable to execute instructions including at least one conditional instruction from a set of conditional instructions; a register file having a plurality of registers operable to store data values for access by the pipelined processing unit when executing said instructions, a register specified by an instruction being either a source register holding a source data value for that instruction or a destination register into which is stored a result data value generated by execution of that instruction; the register file having a predetermined number of read ports via which data values can be read from registers of the register file; the pipelined processing unit being operable when executing the at least one conditional instruction to produce a result data value which, dependent on the existence of the condition specified by that conditional instruction, represents either the result of a computation specified by that conditional instruction or a current data value stored in the destination register for that conditional instruction; each conditional instruction in the set being constrained to specify a register which is both a source register and a destination register for that conditional instruction, so as to reduce the minimum number of read ports required to support execution of that conditional instruction by the pipelined processing unit.

The pipelined processing unit is operable when executing a conditional instruction from a set of such instructions to produce a result data value. To achieve this, it is determined whether the condition specified by that conditional instruction exists, and if it does a computation specified by that conditional instruction is performed in order to produce the result data value. Otherwise, the pipelined processing unit is arranged to produce as the result data value a current data value stored in the destination register for that conditional instruction. Additionally, each conditional instruction in the set is constrained to specify a register which is both a source register and a destination register for that conditional instruction, this having the effect of reducing the minimum number of read ports required to support execution of that conditional instruction by the pipelined processing unit. By placing this constraint on the way in which the conditional instruction is specified, the design of the pipelined processing unit can be significantly simplified, since there is no longer a requirement to provide complex forwarding paths and associated selection logic to support execution of dependent instructions, nor does the use of the conditional instruction adversely impact the number of read ports required. In particular, by reducing the minimum number of read ports required to support execution of the conditional instruction, this reduces the likelihood that the number of read ports required to be provided for the register file is constrained by the need to support execution of the conditional instructions.

It will be appreciated that the pipelined processing unit may be arranged to evaluate the existence or not of the condition specified by the conditional instruction in a variety of ways. However, in one embodiment, the data processing apparatus further comprises one or more control registers not forming part of the register file, and operable to store condition flags referenced by the pipelined processing unit in order to determine whether the condition specified by the conditional instruction exists, whereby the minimum number of read ports of the register file required to support execution of that conditional instruction by the pipelined processing unit is the same as would be required for a non-conditional version of that instruction.

In such embodiments, the condition flags are read from a part of the apparatus separate to the register file, and accordingly a read port does not need to be provided on the register file for the reading of those condition flags. Accordingly, it can be seen that in this instance the conditional nature of the instruction has no adverse impact on the number of read ports required.

Hence, as an example, if the conditional instruction is an add instruction which, assuming the specified condition exists, is operable to add together the data values in two specified registers, then since the technology uses one of the source registers also as a destination register, it can be seen that the register file only needs to have two read ports in order to enable execution of that conditional instruction by the pipelined processing unit, assuming that the source operands are to be read from the register file in a single cycle. Since two read ports would also need to be provided in order to support execution of a non-conditional version of that add instruction, then it can be seen that the need to support execution of that conditional instruction by the pipelined processing unit had no adverse effect on the actual number of read ports required to be provided for the register file.

Hence, considering the above example, if the maximum number of read ports required to support all of the other instructions that could be executed by the pipelined processing unit is two, then the register file only needs to have two read ports. If however one or more of the other instructions whose execution is to be supported by the pipelined processing unit require three or more source operands, then it may be necessary to provide the register file with three or more read ports, if all of the source operands are to be read in a single cycle, but it is important to note that that read port requirement is not due to the need to support the conditional instruction, but rather is a requirement resulting from other factors.

In an alternative embodiment, a register of the register file is operable to store data referenced by the pipelined processing unit in order to determine whether the condition specified by the conditional instruction exists, whereby the minimum number of read ports of the register file required to support execution of that conditional instruction by the pipelined processing unit is only one more than would be required for a non-conditional version of that instruction. Hence, in such embodiments, a read port is also required in order to enable the data needed to assess whether the condition exists to be read from the register file, but even so this only requires the minimum number of read ports to be one more than would be required for a non-conditional version of that instruction.

It will be appreciated that the manner in which the conditional instruction is constrained to specify a register which is both a source register and a destination register can take a variety of forms. For example, the syntax of the instruction may be considered as identifying a selected one of the source registers to be used as the destination register, or alternatively may be viewed as specifying a destination register which also forms one of the source registers. Further, in embodiments where the syntax is such that a selected one of the source registers is viewed as being a destination register, the actual source register to be used as the destination register may be specified by one or more bits encoded within the instruction. Alternatively, no such selection may be supported, and instead the destination register may be defined to be a predetermined one of the source registers of the conditional instruction.

The condition specified by the conditional instruction is typically encoded by a predetermined number of bits of the instruction. Certain other bits of the instruction are then used to define the computation to be performed by the conditional instruction assuming the condition does exist, whilst yet further bits specify the source and destination registers. However, in accordance with one embodiment of the present invention, the condition specified by the at least one conditional instruction is encoded within that conditional instruction using bits of the instruction that would otherwise be used for defining a source or destination register were the conditional instruction not constrained to specify a register which is both a source register and a destination register. This leads to a particularly efficient encoding. It further allows the same number of bits to be used to specify both the conditional instruction and a non-conditional version of that instruction. For example, a non-conditional version of the instruction may provide bits specifying "opcode, destination register, source register 1, source register 2", whilst the conditional variant may provide a sequence of bits specifying "opcode, destination register, condition, source register".

In one embodiment, the instructions executed by the pipelined processing unit include a plurality of conditional instructions which are constrained to specify a register which is both a source register and a destination register. In one particular embodiment, the instructions executed by the pipelined processing unit are instructions of a predicated instruction set. In accordance with such embodiments, it can be seen that the predicated instructions within the predicated instruction set are actually conditional instructions which can be viewed as always being executed, but with the result produced being dependent on the existence or not of the condition. This has no effect on the way in which the predicated instruction is viewed, since one of the possible results produced is equivalent to non-execution of the predicated instruction.

Viewed from a second aspect, the technology provides a method of operating a data processing apparatus comprising a pipelined processing unit for executing instructions including at least one conditional instruction from a set of conditional instructions, and a register file having a plurality of registers operable to store data values for access by the pipelined processing unit when executing said instructions, a register specified by an instruction being either a source register holding a source data value for that instruction or a destination register into which is stored a result data value generated by execution of that instruction, and the register file having a predetermined number of read ports via which data values can be read from registers of the register file, the method comprising the steps of: when executing the at least one conditional instruction within the pipelined processing unit, producing a result data value which, dependent on the existence of the condition specified by that conditional instruction, represents either the result of a computation specified by that conditional instruction or a current data value stored in the destination register for that conditional instruction; and constraining each conditional instruction in the set to specify a register which is both a source register and a destination register for that conditional instruction, so as to reduce the minimum number of read ports required to support execution of that conditional instruction by the pipelined processing unit.

Viewed from a third aspect, the technology provides a computer program product comprising a computer program including at least one conditional instruction from a set of conditional instructions which when executed causes a data processing apparatus to operate in accordance with the method of the second aspect of the present invention.

DETAILED DESCRIPTION

Figure 1:
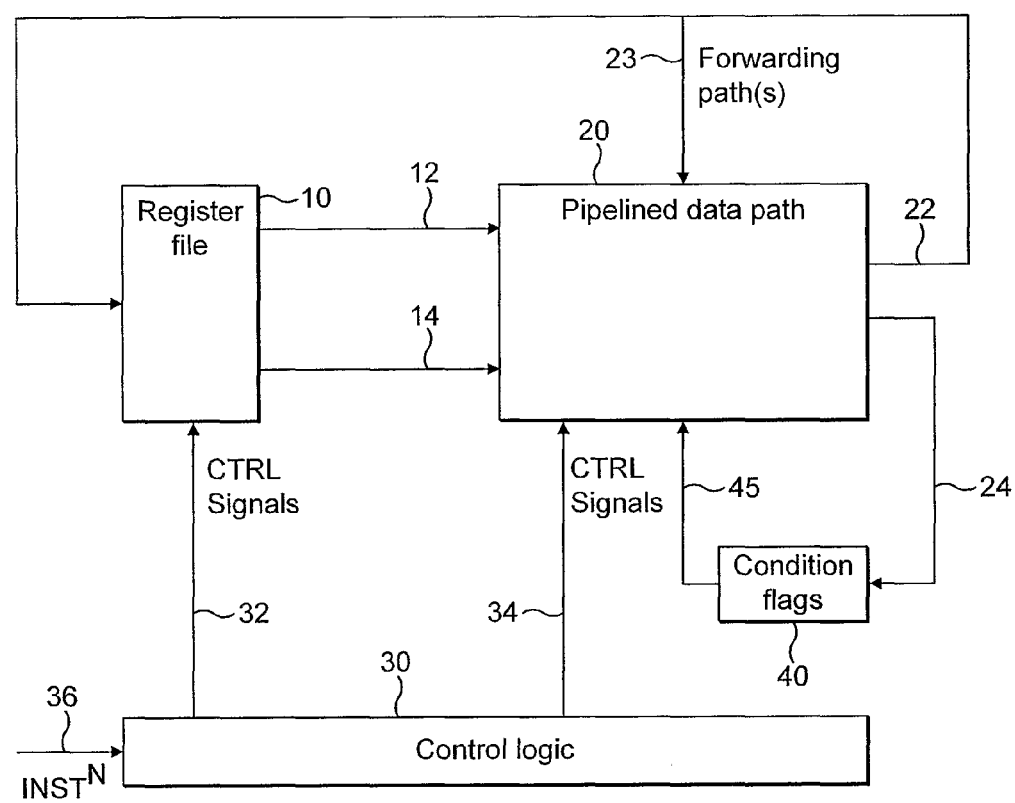
FIG. 1 is a block diagram of a data processing apparatus in which the techniques of preferred example embodiments may be employed.

FIG. 1 is a block diagram of a data processing apparatus in which the techniques of example embodiments may be employed. The data processing apparatus has a pipelined processing unit, which incorporates a pipelined data path 20 for performing data processing operations specified by instructions executed by the pipelined processing unit. A register file 10 is provided having a plurality of registers for storing data values required by the pipelined data path 20 when performing those data processing operations. Further, control logic 30 is provided which, responsive to instructions received over path 36, issues control signals to the register file 10 over path 32 and to the pipelined data path 20 over path 34 in order to cause the required data values to be input from the register file 10 to the pipelined data path 20, and for the appropriate data processing operations to be performed on those data values.

The register file 10 has two read ports, and accordingly can output to the pipelined data path 20 during each clock cycle the data values stored in two registers, these data values being output over paths 12, 14, respectively. The result produced by performing the required data processing operation(s) within the pipelined data path 20 can be output over path 22 for storing in a register of the register file 10 via a write port. Various forwarding paths 23 may also be provided for enabling that result to be forwarded in to one or more of the pipeline stages of the pipelined data path 20 for use in performing data processing operations required by subsequent instructions.

One or more control registers 40 are also provided for storing condition flags that are referenced when determining whether the condition specified by a conditional instruction exists. Certain instructions received by the control logic 30 over path 36 will cause control signals to be issued over path 34 to the pipelined data path 20 to cause operations to be performed to produce updated values for the condition flags held within the register 40, these updated values being output over path 24 from the pipelined data path 20. As an example, a compare instruction may be used to compare two data values, for example data values stored in two specified registers, and to issue updates for the condition flags dependent on that comparison. For example, the comparison operation associated with the comparison instruction may be arranged to subtract one value from the other, and if the result is zero this will cause a zero condition flag (also referred to herein as a Z flag) to be set to one. In one particular embodiment, four condition flags referred to as N, Z, C and V flags are provided within the register 40. The N flag is a negative condition flag, which is set if the result of the last condition code setting instruction was negative, the Z flag is a zero condition flag which is set if the result of the last condition code setting instruction was zero, the C flag is a carry condition flag which is set if a carry is set in the result of the last condition code setting instruction, and the V flag is an overflow condition flag which is set if the result of the last condition code setting instruction was an overflow.

In accordance with example embodiments, the instructions that may be executed within the data processing apparatus include at least one conditional instruction from a set of conditional instructions, and when such a conditional instruction is executed within the pipelined data path 20, the condition flags in the register 40 will be read into the relevant pipelined stage over path 45 in order to allow a determination to be made as to whether the condition specified by that conditional instruction exists. For example, if the conditional instruction specifies an "equal" condition, then this condition will be deemed to exist if the Z flag is set to one.

One way in which conditional instructions are conventionally handled is for an evaluation as to whether the specified condition exists to be made, and for the conditional instruction to either be executed if the condition exists, or otherwise prevented from completing execution. It will be appreciated that prevention of execution can be performed in a variety of ways. As an example, execution of the instruction could be prevented prior to entering the relevant execute stage of the data path. However, alternatively, the instruction could be allowed to execute, but with the result being disabled so that no update to the destination register takes place. Whichever of these approaches is taken, if a conditional instruction is stopped from completing execution once in the pipelined data path, this can potentially affect the correct operation of subsequent data processing operations used to implement dependent instructions, i.e. instructions which specify as one of their source registers the destination register of the conditional instruction. In particular, it can be seen that if the conditional instruction executes, this dependent instruction should take the value of that source register from the result produced by the conditional instruction, whereas otherwise that dependent instruction should take the value of that source register from that stored in the relevant register of the register file 10.

To avoid this additional complexity, the pipelined processing unit of preferred example embodiments is operable when executing a conditional instruction to evaluate the existence of the condition specified by that conditional instruction with reference to the condition flags received over path 45, and then to produce a result data value dependent on that evaluation. If the condition exists, then in the relevant execute stage of the pipelined data path 20, the computation specified by the conditional instruction is performed in order to produce the result data value, whereas if the condition does not exist, a current data value stored in the destination register is produced as the result data value. In either event, this result data value is output over path 22, and hence can be returned to the pipelined data path 20 over the one or more forwarding paths 23 provided, and also can be routed back to the write port of the register file 10 for storage in the appropriate destination register.

To enable the pipelined processing unit to operate in the above manner, it is necessary for the relevant execute stage of the pipelined data path 20 to have access to the current value stored in the destination register. In example embodiments, this is achieved by constraining each conditional instruction in the set to specify a register which is to be used both as a source register and a destination register for that conditional instruction. In one embodiment, the conditional instruction may be arranged to specify a number of source registers, and may further include a field within the instruction which, dependent on its value, will indicate which source register is to be used as the destination register. Alternatively, the source register which is also to be used as a destination register may be predetermined. Hence, in one embodiment, the conditional instruction can be considered to have the following form:

CONDINSTN<cond>Rd, Rm

If the condition specified is determined to exist at the time the pipelined data path 20 is to execute the instruction, then this will cause the pipelined data path to perform the operation:

Rd:=Rd<op>Rm

If the condition does not exist, the pipelined data path will merely produce Rd as the result.

By constraining the conditional instruction in the above manner, it can be seen that the required processing of the pipelined processing unit can be supported even though only two read ports are provided by the register file 10, and hence it is still possible to read into the pipelined data path 20 over paths 12 and 14 in one clock cycle all of the operand data values required for execution of that conditional instruction.

Figure 2:
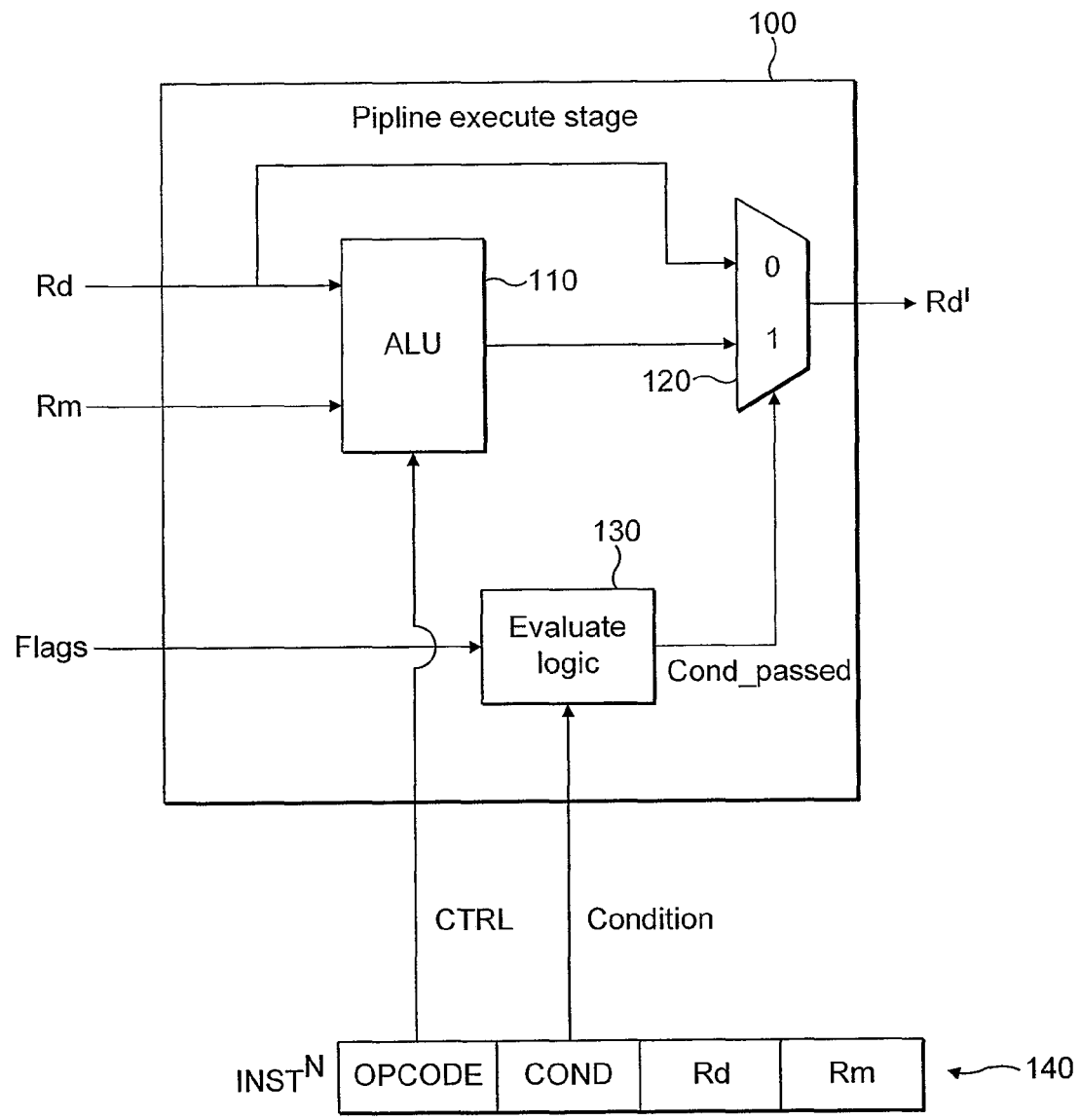
FIG. 2 is a block diagram schematically illustrating elements provided within an execute stage of the pipelined data path of FIG. 1 in accordance with one embodiment.

The processing steps performed within the relevant execute stage of the pipeline data path 20 in one embodiment is illustrated schematically with reference to FIG. 2. As shown in FIG. 2, the pipeline execute stage 100 includes an Arithmetic Logic Unit (ALU) 110 which is arranged to receive the two source data values Rd and Rm. The operation of the ALU 110 is controlled in dependence on the opcode portion of the instruction 140 and hence may be arranged to perform an addition, a subtraction, etc, as required by that instruction. An evaluate logic 130 is also provided for receiving the condition flags stored in the register 40 and the condition specified in the instruction 140, and based thereon to evaluate whether the condition exists. The evaluate logic 130 then outputs a COND_PASSED signal which is set to one if the condition is deemed to exist, and is set to zero if the condition does not exist. This COND_PASSED signal is used to control the operation of the multiplexer 120, which is arranged to receive as one of its inputs the output from the ALU 110 and is arranged to receive at the other of its inputs the value Rd.

Hence, it can be seen that if the condition exists, the multiplexer 120 will output as the value Rd' the output from the ALU, but if the condition is not considered to exist will output as Rd' the input value of Rd. The value of Rd' is then output over path 22 for returning into the pipeline data path 20 over the one or more forwarding paths 23 provided, and/or for returning to the register file 10 for storage within the destination register if required.

Figure 3:
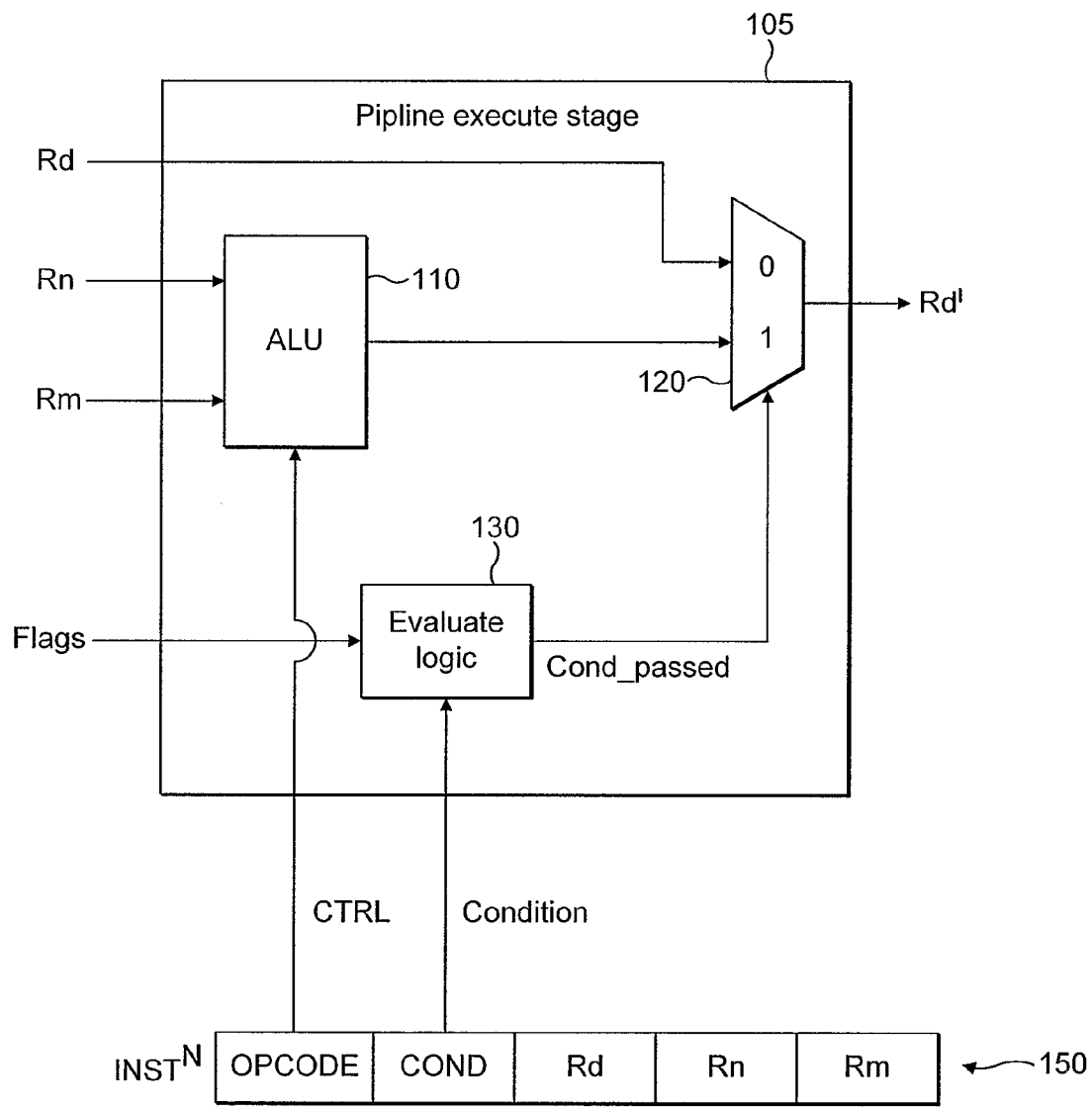
FIG. 3 is a block diagram illustrating the number of inputs which would be required to such an execute stage if techniques of the embodiments were not employed.

FIG. 3 schematically illustrates a similar execute stage 105 that would be required to be provided within the pipelined data path 20 if conditional instructions were not constrained in the manner discussed earlier, and hence could specify separately the destination register and the source registers (in this example two source registers). The basic logic blocks are the same, but it can be seen that three read ports would need to be provided on the register file 10 if it were still desired to be able to read the required operand data values for the conditional instruction in a single cycle. In particular, it can be seen that the data value Rd is not used at all by the ALU 110, but rather is merely provided to the execute stage 105 so that it can be routed as one of the inputs to the multiplexer 120. Such an arrangement hence still allows the pipelined processing unit to produce a result data value for both the situation where the condition is deemed to exist and the situation where the condition is deemed not to exist, but requires the additional cost of providing three read ports for the register file 10. Further, from FIG. 3, it can be seen that the number of bits required to specify the instruction 150 are greater than is required for the instruction 140 shown in FIG. 2.

In addition, it should be noted that if the approach in FIG. 3 were taken, this would further increase the complexity of the pipelined data path 20 itself, since the pipelined data path 20 would need logic to be provided for the three input paths from the register file 10, and would also potentially need forwarding logic to couple into each of these three paths, thereby significantly increasing the complexity of the logic provided within the data path 20.

Figures 4, 5:
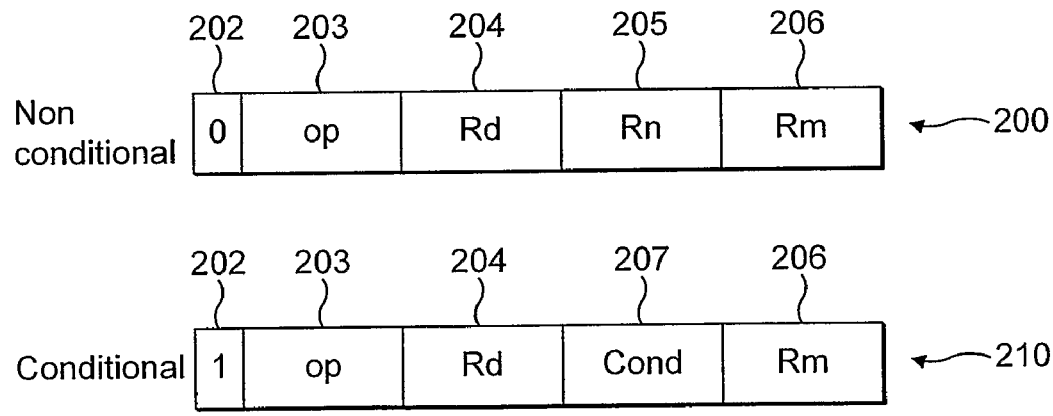
FIG. 4 is a diagram illustrating an example of an instruction sequence incorporating a conditional instruction conforming to example embodiments, and further illustrating the operations performed by that conditional instruction.
FIG. 5 is a schematic diagram illustrating a non-conditional instruction and a corresponding conditional instruction conforming to the example embodiments.

FIG. 4 schematically illustrates an example instruction sequence that incorporates a conditional instruction constrained to specify a register which is both a source register and a destination register. In particular, as can be seen from FIG. 4, a move instruction can be used to move into the register R1 the contents of another register, in this example register R6. Thereafter, a compare instruction may be performed to update the condition flags stored in the register 40 based on a comparison of the contents of two registers, in this example registers R7 and R8. Thereafter, an ADDEQ conditional instruction is performed, with the result data value produced being dependent on the condition flags set as a result of the earlier compare instruction. In particular, the operation performed by the ADDEQ instruction is illustrated in the lower half of FIG. 4. More particularly, if the condition is passed, the contents of registers R1 and R3 are summed in order to produce a result to be returned to the destination register R1. However, if the condition is not passed, then the result of the ADDEQ instruction is merely the current value of register R1. As discussed earlier with reference to FIG. 2, only two read ports are required for the register file 10 in order to allow the pipelined data path 20 to support the execution of this ADDEQ instruction, due to the constraint that the destination register is one of the source registers.

The next instruction executed is then a SUB instruction used to subtract the data value in register R5 from the data value in register R1, with the result being stored in the destination register R1. This SUB instruction is clearly a dependent instruction, since one of its source registers (namely register R1) is the destination register for the earlier conditional ADDEQ instruction. If the pipelined data path 20 had been arranged to handle the conditional ADDEQ instruction by either executing it if a condition is met, or otherwise discarding the instruction, it can be seen that this SUB instruction would potentially need the value of R1 to be obtained from two different places. In particular, if the ADDEQ instruction was executed, the result produced would be the desired value for the operand of the SUB instruction, whereas if the ADDEQ instruction did not execute, the desired value would be that previously stored in register R1 as a result of the earlier MOV instruction. However, this added complexity is removed in example embodiments, due to the fact that the pipelined data path 20 is always arranged to output a result data value when executing the ADDEQ instruction, and so that output data value can be returned over the appropriate forwarding path into the pipelined data path 20 for use in the subsequent SUB instruction.

Another benefit that can be realised when constraining a conditional instruction to specify as its destination register one of its source registers is that it leads to a particularly efficient encoding of the conditional instruction. In particular, non-conditional and conditional variants of a particular instruction can be encoded using the same number of bits, as schematically illustrated in FIG. 5. In particular, a control bit 202 can be provided which is set to 0 to indicate the non-conditional variant, and set to 1 to indicate the conditional variant. It will be appreciated that the meaning of this bit can be reversed if desired. Then, an opcode portion 203 is provided for specifying the operation to be performed by the instruction, with a further portion 204 being used to specify the destination register Rd.

For the non-conditional variant, fields 205 and 206 are then used to specify two source registers. For the conditional variant, the field 206 is still provided to specify one of the source registers, but the other source register is implicitly specified by the field 204, since it is a requirement that the destination register is also one of the source registers. Hence, field 207 incorporating the condition for the conditional instruction can be provided in the bit positions otherwise used in the non-conditional variant for specifying the second source register.

From the above description, it can be seen that through use of the example embodiments, where conditional instructions are constrained to specify a register which is both a source register and a destination register, and the pipelined processing unit is arranged to produce a result data value when executing such a conditional instruction which is dependent on the existence of the condition, the size and cost of the data processing apparatus can be significantly reduced. In particular, the minimum number of read ports of the register file 10 required to support execution of the conditional instruction by the pipelined data path 20 is the same as would be required for a non-conditional version of the instruction when using the data processing apparatus as illustrated schematically in FIG. 1. Even if a different embodiment were envisaged, where instead of the use of the condition flags, the condition associated with the conditional instruction was specified with reference to the contents of one of the general purpose registers in the register file 10, the minimum number of read ports of the register file required to support execution of the conditional instruction would still only be one more than would be required for a non-conditional version of that instruction, due to the need to also read the register whose data is to be used to evaluate the condition. As previously mentioned, this potential reduction can enable a reduction in the number of read ports to be provided for the register file 10, which provides savings in cost and in power consumption. In addition, it can reduce the complexity of the pipelined data path 20 itself, which further reduces cost and power consumption.

In the above description, it has been assumed that the conditional instruction will always be executed within the pipelined processing unit in order to produce a result data value. However, it should be noted that in some implementations it would still be possible to prevent execution of these type of conditional instructions if appropriate. For example if it is determined at an early enough stage in the decode process that such a conditional instruction will not execute, it would be possible not to pass such an instruction into the execute pipeline (such a process being referred to as "killing" the instruction). Hence, the semantics allow such conditional instructions to always be executed, conditionally killed, or a mix of these.

Although particular embodiments have been described herein, it will be appreciated that the technology is not limited thereto and that many modifications and additions thereto may be made within the scope of the technology.

The invention claimed is:

1. A data processing apparatus, comprising:
a pipelined processing unit, having pipeline stages forming a pipeline data path, arranged to execute instructions including a conditional instruction from a set of conditional instructions;
a register file having a plurality of registers arranged to store data values for access by the pipelined processing unit when executing said instructions, a register specified by an instruction being either a source register holding a source data value for that instruction or a destination register into which is stored a result data value generated by execution of that instruction;
the register file having a predetermined number of read ports via which data values can be read from registers of the register file;
the pipelined processing unit being arranged when executing said conditional instruction to produce a result data value which, dependent on the existence of the condition specified by that conditional instruction, represents either the result of a computation specified by that conditional instruction or a current data value stored in the destination register for that conditional instruction;
the pipelined processing unit having at least one data forwarding path to enable the result data value to be forwarded into one or more of said pipeline stages of the pipelined data path without going via said register file;
each conditional instruction in the set being constrained to specify a register which is both a source register and a destination register for that conditional instruction, so as to reduce the minimum number of read ports required to support execution of that conditional instruction by the pipelined processing unit;
the pipelined processing unit being arranged, following execution of said conditional instruction, to execute a dependent instruction, the dependent instruction specifying a source operand with reference to a source register that is the destination register of said conditional instruction;
said result data value being used as said source operand irrespective of the existence of the condition specified by said conditional instruction; and
said result data value being returned over said at least one data forwarding path into the pipelined data path for use in the dependent instruction.

2. A data processing apparatus as claimed in claim 1, further comprising one or more control registers not forming part of the register file, and arranged to store condition flags referenced by the pipelined processing unit in order to determine whether the condition specified by the conditional instruction exists, whereby the minimum number of read ports of the register file required to support execution of that conditional instruction by the pipelined processing unit is the same as would be required for a non-conditional version of that instruction.

3. A data processing apparatus as claimed in claim 1, wherein a register of the register file is arranged to store data referenced by the pipelined processing unit in order to determine whether the condition specified by the conditional instruction exists, whereby the minimum number of read ports of the register file required to support execution of that conditional instruction by the pipelined processing unit is only one more than would be required for a non-conditional version of that instruction.

4. A data processing apparatus as claimed in claim 1, wherein said conditional instruction is arranged to specify a number of source registers and the destination register is defined to be a predetermined one of the source registers of that conditional instruction.

5. A data processing apparatus as claimed in claim 1, wherein the condition specified by said conditional instruction is encoded within that conditional instruction using bits of the instruction that would otherwise be used for defining a source or destination register were the conditional instruction not constrained to specify a register which is both a source register and a destination register.

6. A data processing apparatus as claimed in claim 1, wherein the instructions executed by the pipelined processing unit include a plurality of conditional instructions which are constrained to specify a register which is both a source register and a destination register.

7. A data processing apparatus as claimed in claim 6, wherein said instructions executed by the pipelined processing unit are instructions of a predicated instruction set.

8. A method of operating a data processing apparatus comprising a pipelined processing unit, having pipeline stages forming a pipeline data path, for executing instructions including a conditional instruction from a set of conditional instructions, and a register file having a plurality of registers arranged to store data values for access by the pipelined processing unit when executing said instructions, a register specified by an instruction being either a source register holding a source data value for that instruction or a destination register into which is stored a result data value generated by execution of that instruction the pipelined processing unit having at least one data forwarding path to enable the result data value to be forwarded into one or more of said pipeline stages of the pipelined data path without going via said register file, and the register file having a predetermined number of read ports via which data values can be read from registers of the register file, the method comprising the steps of:
when executing said conditional instruction within the pipelined processing unit, producing a result data value which, dependent on the existence of the condition specified by that conditional instruction, represents either the result of a computation specified by that conditional instruction or a current data value stored in the destination register for that conditional instruction; and
constraining each conditional instruction in the set to specify a register which is both a source register and a destination register for that conditional instruction, so as to reduce the minimum number of read ports required to support execution of that conditional instruction by the pipelined processing unit;
following execution of said conditional instruction, executing a dependent instruction, the dependent instruction specifying a source operand with reference to a source register that is the destination register of said conditional instruction;
returning said result data value over said at least one data forwarding path into the pipelined data path for use in the dependent instruction; and
using said result data value as said source operand irrespective of the existence of the condition specified by said conditional instruction.

9. A method as claimed in claim 8, further comprising the steps of:
storing, within one or more control registers not forming part of the register file, condition flags; and
causing the pipelined processing unit to reference the condition flags in order to determine whether the condition specified by the conditional instruction exists;

whereby the minimum number of read ports of the register file required to support execution of that conditional instruction by the pipelined processing unit is the same as would be required for a non-conditional version of that instruction.

10. A method as claimed in claim 8, further comprising the steps of:

storing, within a register of the register file, data for use in assessing the existence of the condition specified by the conditional instruction; and causing the pipelined processing unit to reference that data in order to determine whether that condition exists;

whereby the minimum number of read ports of the register file required to support execution of that conditional instruction by the pipelined processing unit is only one more than would be required for a non-conditional version of that instruction.

11. A method as claimed in claim 8, wherein said conditional instruction specifies a number of source registers and the destination register is defined to be a predetermined one of the source registers of that conditional instruction.

12. A method as claimed in claim 8, further comprising the step of:

encoding the condition specified by said conditional instruction within that conditional instruction using bits of the instruction that would otherwise be used for defining a source or destination register were the conditional instruction not constrained to specify a register which is both a source register and a destination register.

13. A method as claimed in claim 8, wherein the instructions executed by the pipelined processing unit include a plurality of conditional instructions which are constrained to specify a register which is both a source register and a destination register.

14. A method as claimed in claim 13, wherein said instructions executed by the pipelined processing unit are instructions of a predicated instruction set.

15. A computer program product comprising a computer program stored on a computer readable medium and including a conditional instruction from a set of conditional instructions and a dependent instruction which when executed by a data processing apparatus causes the data processing apparatus to operate in accordance with the method of claim 8.

* * * * *